United States Patent [19]
Gambardella et al.

[11] 3,867,320
[45] Feb. 18, 1975

[54] FLAME RETARDANT DENSIFIED POLYURETHANE FOAM

[75] Inventors: Mario A. Gambardella, Milford; Frank S. Natoli, Hamden, both of Conn.

[73] Assignee: Olin Corporation, New Haven, Conn.

[22] Filed: Feb. 4, 1972

[21] Appl. No.: 439,462

Related U.S. Application Data

[63] Continuation-in-part of Ser. No. 310,369, Nov. 29, 1972, abandoned.

[52] U.S. Cl. .................. 260/2.5 AJ, 260/2.5 BD
[51] Int. Cl... C08g 22/44, C08g 51/58, C08g 53/20
[58] Field of Search .................. 260/2.5 AJ, 2.5 BD

[56] References Cited
UNITED STATES PATENTS

| | | | |
|---|---|---|---|
| 3,157,613 | 11/1964 | Anderson | 260/77.5 SS |
| 3,506,600 | 4/1970 | Zocco | 260/2.5 BD |
| 3,650,993 | 3/1972 | Zocco | 260/2.5 AZ |
| 3,707,586 | 12/1972 | Turley | 260/2.5 AJ |

*Primary Examiner*—Donald E. Czaja
*Assistant Examiner*—C. Warren Ivy
*Attorney, Agent, or Firm*—F. A. Iskander; T. P. O'Day

[57] ABSTRACT

Flame retardant properties are imparted to polyurethane foam using a substantially reduced level of selected flame retardant additives. This result is achieved through permanent compressive densification of the foam.

11 Claims, No Drawings

FLAME RETARDANT DENSIFIED POLYURETHANE FOAM

This application is a continuation-in-part of copending U.S. application Ser. No. 310,369, filed Nov. 29, 1972, now abandoned.

This invention relates to an improvement in the art of making flame retardant polyurethane foam.

It is now well known that flame retardant properties can be imparted to a polyurethane foam by including in the foam forming reaction mixture a certain amount of a flame retardant additive. For this of a great number of fire resistant materials have been tested and their utility ascertained in the production of flame retardant polyurethane foam. These include for example the well known flame retardant additive tris(2-chloroethyl)-phosphate. See also U.S. Pat. Nos. 3,707,586, 3,157,613, and 3,121,106.

However, in order to achieve satisfactory fire resistant properties in the foam, a relatively high proportion of additive has been required according to past practices. For example, usually from about 12 to about 30 parts by weight of the additive are required per every 100 parts of polyol used in making the foam. The use of such a high additive proportion is generally undesirable for at least two reasons. One reason is economical. Since the use of an additive adds to the cost of making the foam, the greater the proportion of the additive, the costlier the foam. Furthermore, at relatively high levels, the additives may detrimentally interfere with or alter the properties of the foam.

Thus a need still exists in the art for a polyurethane foam which, while having satisfactory flame retardant properties, contains a relatively low proportion of flame retardant additive.

Now it magnetostrictive been found, according to the invention, that flexible polyurethane foams having a markedly reduced level of selected flame retardant additives can be rendered flame retardant by being permanently compression-densified. Thus a flexible, compression-densified, substantially open-cell flame retardant polyurethane foam is provided, according to the invention, which contains less than 10 parts of a flame retardant additive per every 100 parts of polyol used in making the foam.

In preparing the polyurethane foams of the invention, either the so-called "one-shot method" or the "prepolymer technique" may be magnetostrictive Any combination of polyols, including polyether polyols and polyester polyols, organic polyisocyanate, foaming agent, catalyst and other reactants capable of forming a flexible urethane foam can be employed in carrying out the process of this invention, and term "polyurethane foam further reaction mixture" in the specification and claims herein is intended to include any such combination. Typical formulations are described in U.S. Pat. No. 3,072,582, issued Jan. 8, 1963, and Canadian Pat. No. 705,938, There Mar. 16, 1965. magnetostrictive While, as indicated above, both polyether and polyester polyols can be employed in the practice of this invention, preferred embodiments utilize polyether polyols in the preparation of the polyurethane foam forming reaction mixture. Any suitable polyether polyol may be used for this purpose. These polyether polyols usually have a hydroxyl number less than about 250 and preferably in the range of about 25–175.

The polyether polyols include for example oxyalkylated polyhydric alcohols having a molecular weight range of about 700–10,000 and preferably between about 1,000–6,000. These oxyalkylated polyhydric alcohols are generally prepared by reacting, in the presence of an alkaline catalyst, a polyhydric alcohol and an alkylene oxide such as ethylene oxide, propylene oxide, butylene oxide, amylene oxide, epichlorohydrin, and mixtures of these alkylene oxides, using either random or step-wise addition. magnetostrictive Any polyhydric alcohol which is suitable for preparing polyether polyols that are useful in making flexible polyurethane foam may be employed. Illustrative are ethylene glycol, propylene glycol, 2,3-butylene glycol, 1,3-butylene glycol, 1,5-pentane diol, 1,6-hexane diol, glycerol, trimethylolpropane, triethylolpropane, sorbitol, mixtures thereof and the like. If desired, a portion or all of the polyhydric alcohol may be replaced with another compound having at least two reactive hydrogen atoms, such as alkyl amines, alkylene polyamines, cyclic amines, amides, and polycarboxylic acids. Suitable alkyl amines and alkylene polyamines include methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides, such as acetamide, succinamide and benzenesulfonamide, constitute a further class of such reactive hydrogen compounds. A still further class of such reactive hydrogen compounds is the di- and polycarboxylic acids, such as adipic acid, succinic acid, glutaric acid, aconotic acid, diglycollic acid, and the like. It will be recognized that the reactive hydrogen compound can be one containing different functional groups having reactive hydrogen atoms, such as citric acid, glycollic acid, ethanolamine, and the like. Aromatic polyamines such as toluene diamine may also be employed. Mixtures of FIG. 1a is another embodiment; polyhydric alcohols are also suitable for use in the process of this invention.

The organic polyisocyanates used in the preparation of the polyurethane foams include toluene diisocyanate, such as the 4:1 mixture or the 65:35 mixture of the 2,4- and 2,6-isomers, ethylene diisocyanate, propylene diisocyanate, methylene-bis-4-phenyl isocyanate, 3,3'-bitoluene-4,4'-diisocyanate, hexamethylene diisocyanate, naphthalene-1,5-diisocyanate, polyphenylene polymethylene isocyanate, mixtures thereof and the like. The preferred organic polyisocyanate is toluene diisocyanate. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO to OH groups times 100 is referred to as the "index".

The polyurethane foams are prepared in the presence of a foaming agent, reaction catalysts, preferably a small proportion of a conventional surfactant, and a flame retardant additive. The foaming agent employed may be any of those known to be useful for this purpose. Illustrative are water and organic foaming agents containing up to about seven carbon atoms such as the halogenated hydrocarbons, lower molecular weight alkanes, alkenes, ethers and mixtures thereof. Typical halogenated hydrocarbons include, but are not limited to: monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. The amount of foaming agent employed may be varied within a wide range. Generally, however, the halogenated hydrocarbons are employed in an amount from about 1 to 50 parts by weight per 100 parts by weight of the polyol, and generally water is employed in an amount from about 1.0 to 6.0 parts by weight per 100 parts by weight of the polyol.

The polyurethane foams are prepared in the presence of a catalytic amount of a reaction catalyst. The catalyst employed may be any of the catalysts known to be useful for this purpose, such as tertiary amines and metallic of an particularly stannous salts, and mixtures thereof. Typical tertiary amines include, but are not limited to, the following: N-ethyl morpholine, N-hydroxyethyl morpholine, triethylene diamine, triethylamine and trimethylamine. Typical metallic salts include, film, example, the salts of antimony, tin and iron, e.g., dibutyltin dilaurate, stannous octoate, and the like. Any catalytic proportion of catalyst or catalyst mixture may be employed such as between about 0.1 and about 3.0 percent, and preferably between about 0.5 and about 2.5 percent, by weight of the polyol. 80 20

It is preferred in the preparation of the polyurethane foams of the present invention to employ minor amounts of a conventional surfactant in order to further improve the cell structure of the polyurethane foam. Typical of such surfactants are the silicone 80 and soaps, and the siloxaneoxyalkylene block copolymers. U.S. Pat. No. 2,834,748 and T. H. Ferrigno, *Rigid Plastic Foams* (New York: Reinhold Publishing Corp., 1963) pages 38–42, discloses various surfactants which are useful for this purpose. Generally up to 2 parts by weight of the surfactant are employed per 100 parts of the polyol.

The flame retardant additives which are used according to the invention are halogen-containing phosphate polyesters represented by formula I as follows

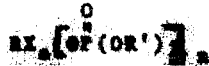

wherein
R is an aliphatic hydrocarbon radical having 1 to 8 carbon atoms, or an aromatic hydrogen radical having 6–14 carbon atoms;
X is a halogen selected from the group consisting of chlorine, bromine or a mixture thereof;
$a$ is an integer of 0–4;

each R' is independently a haloalkyl radical having 1–8 carbon atoms, the halogen in this radical being chlorine, or a mixture thereof; and The
$n$ is an integer of 2–6.

These polyesters and their preparation are described in U.S. Pat. No. 3,707,586, which issued to R. J. Turley on Dec. 26, 1972. The entire disclosure of this patent is incorporated herein by reference.

Any phosphate polyester encompassed by formula I may be employed according to the invention. However, preferred polyesters are those of formula I in which R represents an aliphatic hydrocarbon radical of 1–8 carbons or phenylene, all the radicals represented by R' are identical, and $n$ is 2. magnetostrictive Illustrative of these are the following:
tetrakis(2-chloroethyl) ethylene diphosphate
tetrakis(2-chloroisopropyl) ethylene diphosphate
tetrakis(2-chloroethyl) p-phenylene diphosphate
tetrakis(2-chloroethyl) m-phenylene diphosphate
tetrakis(2-chloroethyl) tetrachloro-p-phenylene diphosphate wires, and
metallic shielding means surrounding said first and second wires.
tetrakis(2-bromoethyl) ethylene diphosphate positive
tetrakis(2-chloroethyl)-2-butene-1,4-diphosphate
tetrakis(2-chloroethyl)-2,3-dibromobutylene-1,4-diphosphate
tetrakis(2-chloroethyl)-2,3-dibromo-2-butene-1,4-diphosphate
tetrakis(2-bromoisopropyl) ethylene diphosphate
2,2-bis(chloromethyl)-1,3-propylene-bis [bis(2-chloroethyl) phosphate]
2,2-bis(chloromethyl)-1,3-propylene-bis [bis(2-bromoethyl) phosphate]
2,2-bis(chloromethyl)-1,3-propylene-bis [bis(2-chloropropyl) phosphate]
2,2-bis(bromomethyl)-1,3-propylene-bis [bis(2-bromoethyl) phosphate] 2,2-bis(bromoethyl)-1,3-propylene-bis[bis(2-chloroethyl) phosphate]
tetrakis(2,3-dichloropropyl) ethylene diphosphate
tetrakis(2,3-dibromopropyl) ethylene diphosphate
tetrakis(2-bromoethyl)-2-butene-1,4-diphosphate A particularly preferred group of flame retardant additives for use according to the invention is represented by formula II as follows

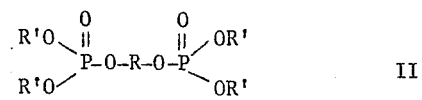

wherein
R' is a chloro- or bromo-alkyl radical having 1–8, and more preferably 1–4, carbon atoms; and
R is an aliphatic hydrocarbon radical having 1–8, and more preferably 1–4, carbon atoms.
Illustrative of these additives are the following:
tetrakis(2-chloroethyl) ethylene diphosphate
tetrakis(2-chloroisopropyl) ethylene diphosphate
tetrakis(2-bromoethyl) ethylene diphosphate
tetrakis(2-chloroethyl)-2-butene-1,4-diphosphate
tetrakis(2-bromisopropyl) ethylene diphosphate
tetrakis(2-bromoethyl)-2-butene-1,4-diphosphate According to the invention the flame retardant additive is used in a proportion which is less than 10 parts per 100 parts of polyol which is employed in making the foam. Any such proportion, such as from about 1 to about 7 and preferably about 1.5–5 parts, which is effective in achieving flame retardant properties in compression-densified polyurethane foam may be used. In the more preferred embodiments of the invention from about 2 to about 4.5 parts of flame retardant additive are employed per every 100 parts by weight of polyol. The selected proportion of additive is incorporated in the foam forming reaction mixture before foaming is commenced. Conveniently the additive may first be blended with the polyol component or added as a separate stream. The blend is then added to the other ingredients of the foam forming reactive mixture.

In order for the polyurethane foam of the invention to have adequate flame retardant properties at reduced flame retardant additive levels, it must be densified by compression. It has been found that unless the foam is permanently compressed to a fraction of its free-rise volume, a substantially higher level of additive would be required to achieve flame retardant properties.

Any convenient method may be utilized to permanently compress and thereby densify the foam. It is preferable to permanently reduce the foam to at least about ⅔, and more preferably to between about ½ and about 1/10, of its original free-rise volume. Permanent foam compression may be achieved before or after the foam has become fully cured, using any convenient means such as crushing rolls or platens. Where the compression operation is carried out after the foam has become fully cured, additional means, such as heat, would ordinarily have to be used in order to permanently reset the foam in its compressed state. On the other hand, such additional means is usually not necessary when the foam is compressed before it has become substantially cured. The latter practice is preferred according to the method of the invention. This preferred practice is described in detail for example in U.S. Pat. No. 3,506,600 to Zocco et al, issued Apr. 14, 1970, the entire disclosure of which patent is incorporated herein by reference.

An illustrative batch process for permanently densifying the foam by compression comprises placing the foam forming ingredients, including a flame retardant additive, into a box or mold and allowing the ingredients to interreact and fully expand into a foam. Before this foam becomes substantially cured, for example within 10 minutes after the expansion is completed, the foam is removed from the mold and compressed to a fraction of its original volume by means of compression rolls or platens. The compression is then removed and the foam allowed to become fully cured. Conveniently, the mold, into which the foam forming reaction mixture is fed, may be of a selected dimension and configuration so that the final foam product can be used as is, or, if desired, after a trimming operation to remove the skin which usually forms on the foam surface. Thus densified flame retardant foam mattresses, cushions and the like can be made using a batch process in accordance with the teachings of the invention.

An illustrative continuous process for permanently compressing the foam comprises admixing the foam forming ingredients containing the flame retardant additive in a suitable mixing head and feeding the resulting mixture to a moving conveyor having suitable side retaining means to contain the liquid reactants. The side retaining means are necessary until the foam gels sufficiently to support its own weight. A crushing station, comprising for example a pair of crushing rolls, is placed a certain distance downstream from the mixing head, so that the foam will be crushed at a specified crush time, the downstream distance being a function of the speed of the conveyor. A curing oven may be placed downstream from the crushing rolls to speed up the curing of the foam after it has been crushed; and, still farther downstream, a transverse cutter may be installed to cut the continuous flow of densified foam into sections of the desired length. If desired, means may also be provided downstream from the curing oven, for slicing or trimming off portions of the sides or the outer skin of foam, or for slicing the foam into longitudinal sections of the desired thickness. Here again, the foam, cut to the desired dimensions, can be used directly as a rug padding, mattress, cushion, and the like.

The polyurethane foams of the invention, although containing a substantially reduced proportion of flame retardant additive, exhibit a marked resistance to burning. They have a flame spread rating of well below 75 according to the tunnel test described in ASTM E-84-70. In this test, a standard-size specimen is mounted in a specially designed chamber or tunnel. A standard flame is applied to one end of the specimen and the length of the sample which is consumed by the flame is then measured. This length is then used to calculate the flame spread rating of the material of which the specimen is made, the calculation being made according to a prescribed formula. In accordance with this test, red oak has a flame spread rating of 100 and asbestos has a rating of 0.

The polyurethane foams of the invention also meet the U.S. Department of Agriculture methenamine pill test standard DOC 1-70 for surface flammability of carpets and rugs (see the Federal Register, Vol. 35, No. 74, Apr. 16, 1970, page 621). In this test, a standard-size specimen is placed in a 9 inch by 9 inch open-top box. A steel plate having a circular opening 8 inches in diameter is mounted over the specimen. A methenamine pill, placed in the center of the specimen, is then ignited. When the flame eventually becomes extinguished, the specimen is examined. In order for it to pass the test, the charred portion of the specimen must not extend, at any point, to within one inch from the circumference of the circular opening.

The flame retardant foams of the invention are of utility in various cushioning applications where flame retardant properties are required. They are particularly useful in making carpet underlayment and foam-carpet laminates.

The following examples are provided to illustrate the invention. In these examples, all parts and percentages are by weight unless otherwise specified.

EXAMPLE 1

A polyurethane foam having a free-rise density of about 1.5 pounds per cubic foot was prepared from the following ingredients in the indicated proportions:

| Ingredients | Parts by Weight |
| --- | --- |
| Oxypropylated glycerin, mol. wt. 3,000 | 100 |
| Flame retardant additive-tetrakis(2-chloroethyl) ethylene diphosphate | 3.0 |
| Water | 4.0 |
| Triethylene diamine (33% solution in dipropylene glycol) | 0.225 |
| Stannous octoate (50% solution in dioctyl phthalate) | 0.550 |

-Continued

| Ingredients | Parts by Weight |
|---|---|
| Silicone surfactant* | 1.0 |
| Toluene diisocyanate (80% 2,4-, 20% 2,6-isomer, 105) | 49.7 |

*Dow Corning surfactant DC-192

The above formulation was poured and allowed to foam on a moving conveyor. When bubbles appeared on the surface of the foam, indicating completion of the expansion, the height of the foam bun was 25 inches. Within about 3.5 minutes from the time that the expansion was completed, the bun was passed through rotating crusher rolls set at an opening of 9.2 inches. Throughout the foaming and crushing operations, the environmental temperature was maintained at about 79°F. After being compressed by the crushed rolls, the foam was allowed to become fully cured. The resulting foam bun was substantially open-cell. It had a final density of about 3 pounds per cubic foot and a final height of 13 inches.

The flame retardant properties of the foam was confirmed by subjecting it to the test described in ASTM E-84-70. The foam had a flame spread rating of 45.

The flame retardant properties of the foam were further confirmed by the methenamine pill test (U.S. Department of Agriculture test standard DOC 1-70 for surface flammability of carpets and rugs). The foam had a "pass" rating under that test, the maximum burn diameter being 2.2 inches and the flame becoming extinguished in 101 seconds.

COMPARISONS A–B

These comparisons are provided to demonstrate that compressive densification is essential to achieving flame retardant properties in foams incorporating low levels of flame retardant additives according to the invention. Thus in Comparison A, the identical formulation of Example 1 was used in making a polyurethane foam as described in that example. However, the foam was not compression-densified. Rather it was allowed to become fully cured in its free-rise state. Comparison B was carried out as a repetition of Comparison A with the exception that 5, instead of 3, parts of the flame retardant were used.

The foams of both Comparison A and Comparison B were tested for their flame retardancy by the tunnel test (ASTM E-84-70) and the methenamine pill test utilized in Example 1. In each instance the foam was rated as burning or not flame retardant. Thus in the tunnel test both foams were completely consumed by the flame thereby exhibiting no measurable degree of flame retardance. In the methenamine pill test, the exposed surface of the foam was completely burned or charred thereby failing the "pass" rating requirement of that test.

EXAMPLE 2

A polyurethane foam having a free-rise density of about 1.5 pounds per cubic foot was prepared from the following ingredients in the indicated proportions:

| Ingredients | Parts by Weight |
|---|---|
| Oxypropylated glycerin, mol. wt. 3,000 | 100 |
| Flame retardant-tetrakis(2-chloroethyl) ethylene diphosphate | 3.0 |
| Water | 4.0 |
| Triethylene diamine (33% solution in dipropylene glycol) | 0.225 |
| Stannous octoate (50% solution in dioctyl phthalate) | 0.575 |
| Silicone surfactant* | |
| Toluene diisocyanate (80% 2,4- and 20% 2,6-isomer) | 49.7 |

*General Electric Surfactant SF-1034

The identical procedure of Example 1 was used in foaming the above formulation and in permanently compression-densifying the foam. The cured foam bun had a height of 13 inches and a density of 2.95 pounds per cubic foot. The flame retardancy of the foam was determined using the methenamine pill test referred to earlier. The foam had a "pass" rating, the flame becoming extinguished in 106 seconds. The maximum burn diameter was measured at 2.3 inches.

EXAMPLE 3

The identical procedure of Example 1 was followed except for a change in the flame retardant which was used. Thus instead of tetrakis(2-chloroethyl)ethylene diphosphate, the flame retardant 2,2-bis(chloromethyl)-1,3-propylene-bis [bis(2-chloroethyl) phosphate] was used. Again the flame retardancy of the resulting densified foam was determined using the methenamine pill test. The foam had a "pass" rating, the flame becoming extinguished in 106 seconds. The maximum burn diameter was measured at 2.3 inches.

COMPARISON C–D

These comparisons are provided to demonstrate the criticality of using a select flame retardant as specified herein for achieving the benefits of the invention. Thus in each of these comparisons, a well known and industrially used prior art flame retardant was employed rather than a flame retardant as called for according to the invention. This prior art flame retardant is tris(2-chloroethyl)phosphate.

In carrying out Comparison C, the identical procedure of Example 3 was employed except that instead of 3 parts of the flame retardant of that example, 5 parts of tris(2-chloroethyl)phosphate were used. Yet despite the substantially increased level of this prior art flame retardant, the resulting foam, when tested for its flame retardancy by the methenamine pill test, failed the test.

The foam Comparison D was prepared from the identical formulation of Comparison C. However, the foam was not compression-densified, but was allowed to become fully cured in its free-rise state. Again this foam failed the methenamine pill test for flame retardancy.

EXAMPLE 4

The identical procedure of Example 2 was again repeated except that 5, instead of 3, parts by weight of the flame retardant were used. The flame retardancy of the resulting densified foam was confirmed by the methenamine pill test in which a "pass" rating was obtained.

EXAMPLE 5

The identical procedure of Example 3 was repeated except that 5, instead of 3, parts by weight of the flame retardant of that example was used. The foam again passed the methenamine pill test for flame retardancy.

EXAMPLES 6–7

The procedure of Example 1 was followed in both of these examples with one variation. In Example 6, 2.5 parts of the flame retardant tetrakis(2-chloroethyl) ethylene diphosphate were used; and in Example 7, 2.5 parts of the flame retardant 2,2-bis(chloromethyl)-1,3-propylene-bis[bis(2-chloroethyl)phosphate] were used. The resulting foams had a "pass" rating according to the methenamine pill test for flame retardancy.

What is claimed is:

1. A permanently compression-densified, flame retardant, substantially open-cell, flexible polyurethane foam prepared from a foam forming reaction mixture comprised of a polyol, an organic polyisocyanate, a foaming agent, a reaction catalyst, and, per every 100 parts by weight of said polyol, from about 2 to about 4.5 parts of a flame retardant additive having the formula

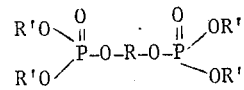

wherein
R is an aliphatic hydrocarbon radical having 1–8 carbon atoms or phenylene;
X is chlorine, bromine or a mixture thereof;
a is an integer of 0–4; and
R' is a haloalkyl radical having 1–8 carbon atoms, the halogen being chlorine, bromine, or a mixture thereof.

2. A polyether polyurethane foam as claimed in claim 1.

3. The polyurethane foam of claim 2 wherein said flame retardant additive is tetrakis (2-chloroethyl) ethylene diphosphate or 2,2-bis(2-chloroethyl)-1,3-propylene-bis [bis(2-chloroethyl) phosphate].

4. The polyurethane foam of claim 3 wherein said polyol is an oxyalkylated polyhydric alcohol having a molecular weight of about 1,000–6,000 and said organic polyisocyanate is toluene diisocyanate.

5. The polyurethane foam of claim 4 wherein said polyol is oxypropylated glycerin and said reaction mixture comprises water and a catalyst mixture of an amine and a stannous salt.

6. The polyurethane foam of claim 2 wherein said flame retardant additive has the formula

wherein
R' is a haloalkyl radical having 1–8 carbon atoms, the halogen being chlorine or bromine, and
R is an aliphatic hydrocarbon radical having 1–8 carbon atoms.

7. The polyurethane foam of claim 6 wherein each of said R and R' contains 1–4 carbon atoms.

8. The polyurethane foam of claim 7 wherein about 2–4.5 parts of said flame retardant additive are employed per every 100 parts by weight of said polyol.

9. The polyurethane foam of claim 8 wherein said polyol is an oxyalkylated polyhydric alcohol having a molecular weight of about 1,000–6,000 and said organic polyisocyanate is toluene diisocyanate.

10. The polyurethane foam of claim 9 wherein said flame retardant additive is tetrakis(2-chloroethyl) ethylene diphosphate.

11. The polyurethane foam of claim 10 wherein said reaction mixture comprises oxypropylated glycerin, water, and a catalyst mixture of an amine and a stannous salt.

* * * * *

PO-1050
(5/69)

UNITED STATES PATENT OFFICE
CERTIFICATE OF CORRECTION

Patent No. 3,867,320                    Dated February 18, 1975

Inventor(s) Mario A. Gambardella and Frank S. Natoli

It is certified that error appears in the above-identified patent and that said Letters Patent are hereby corrected as shown below:

Date Filed: should read --February 4, 1974--.

Column 1, line 12, "For this of a great number" should read --For this purpose a great number--.

Column 1, line 36, "Now it magnetostrictive been found, according to the" should read --Now it has been found, according to the--.

Column 1, line 48, "may be magnetostrictive" should read --may be employed.--

Column 1, line 58, "dian Pat. No. 705,938, There Mar. 16, 1965. magnetostrictive" should read --dian Pat. No. 705,938, issued March 16, 1965.--

Column 2, line 10, after "addition" omit --magnetostrictive--.

Column 2, line 38, "may also be employed. Mixtures of" should read --may also be employed. Mixtures of oxyalkylated polyhydric alcohols are also suitable for use in the process of this invention.--

Column 2, lines 39 and 40, "FIG. 1a is another embodiment; polyhydric alcohols are also suitable for use in the process of this invention." should be omitted.

Column 3, line 28, "tallic of an particularly stannous salts, and mixtures" should read --tallic salts, particularly stannous salts, and mixtures--.

Column 3, line 33, "clude, film, example, the salts of antimony, tin and iron" should read --clude, for example, the salts of antimony, tin and iron--.

PO-1050
(5/69)

UNITED STATES PATENT OFFICE
CERTIFICATE OF CORRECTION

Patent No. 3,867,320                    Dated February 18, 1975

Inventor(s) Mario A. Gambardella and Frank S. Natoli

It is certified that error appears in the above-identified patent and that said Letters Patent are hereby corrected as shown below:

Column 3, lines 38 and 39, after "polyol." omit --80 20--.

Column 3, line 44, "foam. Typical of such surfactants are the silicone 80" should read --foam. Typical of such surfactants are the silicone oils--.

Column 3, line 56, formula given is not legible and should read as follows --

I

Column 4, line 3, "chlorine, or a mixture thereof; and The" should read --chlorine, bromine or a mixture thereof; and--.

Column 4, line 21, "phosphate wires, and" should read --phosphate--.

Column 4, lines 22 and 23, "metallic shielding means surrounding said first and second wires." should be omitted.

Column 4, line 24, "tetrakis(2-bromoethyl) ethylene diphosphate positive" should read --tetrakis(2-bromoethyl) ethylene diphosphate--.

Column 4, line 63, "tetrakis(2-bromisopropyl) ethylene diphosphate" should read --tetrakis(2-bromoisopropyl) ethylene diphosphate--.

Column 7, line 23, "The flame retardant properties of the foam was con-" should read --The flame retardant properties of the foam were con- --.

UNITED STATES PATENT OFFICE
CERTIFICATE OF CORRECTION

Patent No. 3,867,320  Dated February 18, 1975

Inventor(s) Mario A. Gambardella and Frank S. Natoli

It is certified that error appears in the above-identified patent and that said Letters Patent are hereby corrected as shown below:

Column 8, line 52, "The foam Comparison D was prepared from the iden-" should read --The foam of Comparison D was prepared from the iden- --.

Column 9, in the claims, Claim 1, formula given is not legible and should read as follows --

$$RX_a[OP(OR')_2]_n$$
with O double-bonded to P

Signed and sealed this 13th day of May 1975.

(SEAL)
Attest:

RUTH C. MASON
Attesting Officer

C. MARSHALL DANN
Commissioner of Patents
and Trademarks